Aug. 15, 1950  F. G. BUSENIUS  2,518,974
LOG STAKE FOR TRUCKS

Filed Oct. 16, 1948  2 Sheets-Sheet 1

Ferdinand G. Busenius
INVENTOR.

BY

Aug. 15, 1950          F. G. BUSENIUS          2,518,974
                       LOG STAKE FOR TRUCKS
Filed Oct. 16, 1948                        2 Sheets-Sheet 2
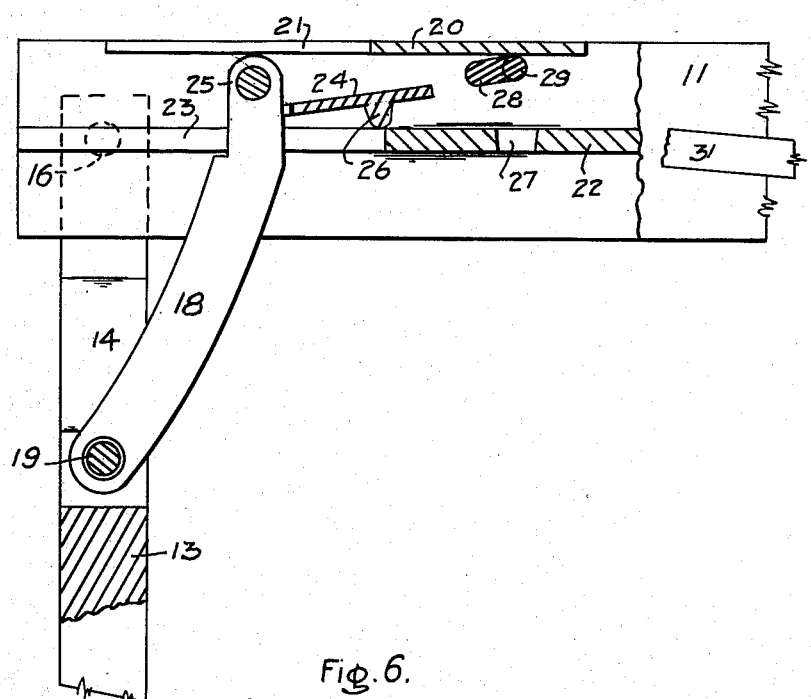
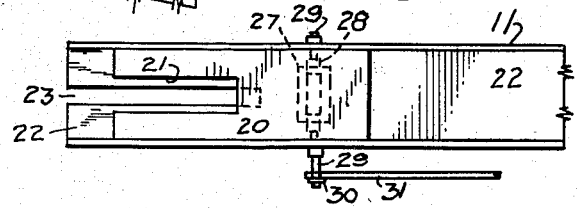
Ferdinand G. Busenius
INVENTOR.

Patented Aug. 15, 1950

2,518,974

UNITED STATES PATENT OFFICE 2,518,974

LOG STAKE FOR TRUCKS

Ferdinand G. Busenius, Graham, Wash., assignor of one-half to Albert S. Busenius, Tacoma, Wash.

Application October 16, 1948, Serial No. 54,975

4 Claims. (Cl. 280—145)

This invention relates to the side stakes on logging trucks, which are adapted to hold the logs from rolling off the truck while being loaded and transported.

My invention comprises a stake which is permanently mounted on the truck and which is releasably held in upright position by means operated from the opposite side of the truck.

My invention further comprises means for holding said stake in operating position; means for locking said holding means in operative position; and means for releasably locking said locking means in operative position.

My invention further comprises means for reducing the strain on the stake holding mechanism by removing the connection therewith high above the stake pivot and by curving the holding link.

The objects of my invention are to provide such a stake which is safe to operate, positive in action, and which may be unlocked with ease and safety in spite of the heavy pressure thereon by the load of logs; to provide such a mechanism which is simple to make and to repair, effective in use, and able to withstand the violent usage incident to loading, transporting and unloading logs under extremely rough conditions.

I attain these and other objects by the devices, mechanisms and arrangements illustrated in the accompanying drawings, in which—

Figure 1:
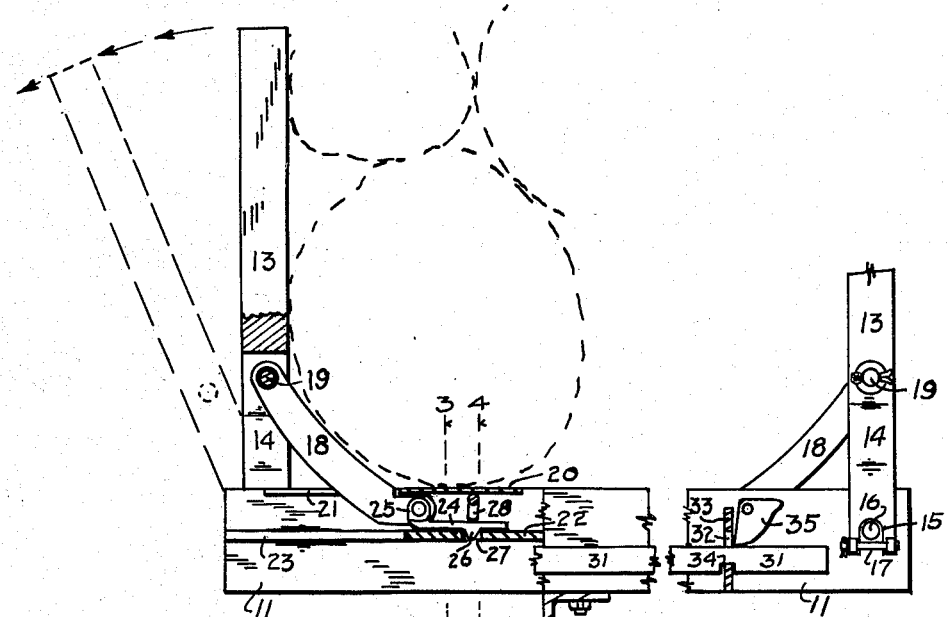
Figure 2:
Figure 2:
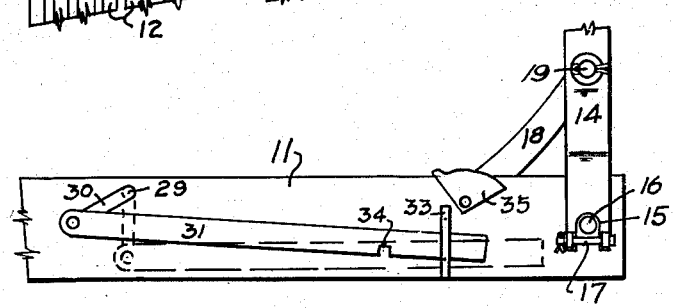
Figure 3:
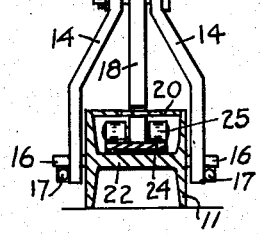
Figure 4:
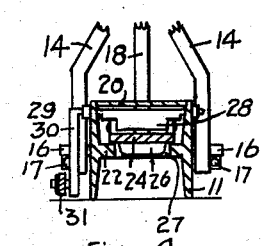

Fig. 1 is a side elevation, partly in section, showing a bunk mounted across a truck and showing the stakes in operative position; Fig. 2 is a similar view of one end thereof, showing the lock locking means in unlocked position; Fig. 3 is a cross-section thereof taken on the line 3—3 in Fig. 1; Fig. 4 is a similar view taken on the line 4—4 in Fig. 1; Fig. 5 is a section thereof, drawn to a larger scale, showing the stake in dropped position, and the locking means in released position; and Fig. 6 is a plan view of the end of the bunk, the stake having been removed, and illustrating the slots in the bunk web and in the cover plate.

Identical numerals of reference refer to the same parts illustrated in the several views.

Modern logging operations are carried on very largely by the use of trucks operating under very rough conditions on trails and primitive roads. It is necessary, therefore, to have stakes thereon capable of holding the load of logs from spilling under all conditions. These stakes must, however, be mounted in such a way that the logs can be unloaded from the opposite side of the truck in order that the operator may be safe from the danger of being hit by the heavy logs as they tumble off the truck. Other inventors have provided various forms of stakes and of their locking means but, so far as I am aware, none of these devices have produced a locking means which cannot get jammed by the heavy side pressure of the logs against the stake, thus making it very difficult to unlock the stakes when it is desired to unload the logs.

My improved logging stake is provided with a positive holding means which cannot get jammed and yet cannot become released accidentally, and which is, itself, locked by manually operated means, and which, when thus unlocked, is automatically released by the side pressure of the load of logs acting on the stake.

Referring, now, to the drawing it will be seen that the truck deck or frame 10 is provided with a log bunk 11 secured thereto. This bunk 11 comprises an I-beam (Figs. 3, 4) laid on edge and extending across the truck to a point beyond the truck wheels 12. A stake 13 is mounted at each end of the bunk. Usually two bunks are provided on a logging truck, but more may be used if desired.

It is to be understood that the description of one stake, and its operation and control, applies to all the stakes mounted on the truck. The stake 13 is provided with a bifurcated lower end, the tines 14 of which span the end of the bunk 11 and which are pivotally secured thereto. Slots 15 are provided at the end of the tines 14 and are adapted to receive the concentric pivot pins 16 which are welded to the outsides of the bunk 11. A removable bolt 17 closes the end of each slot 15 to hold the stake 13 on its pivots, thus providing for the demounting of the stake for repair, or otherwise.

A holding link 18 is secured to the stake 13 between the upper portions of the tines 14 by means of a pivot bolt 19. This tie link 18 extends downward and inward on a curved line, as shown, to the bunk and is pivotally attached to the following described lock mechanism, by means of which the stake 13 is firmly held in upright position until it is released, and then the stake falls outward on its pivot pins 16 into the position shown in Fig. 5.

A cover plate 20 is welded to the bunk inside of the upper flanges of the I-beam and extends across the beam substantially on a level with the upper edge of the bunk, thus forming an open-ended box of the end of the bunk. This plate 20 is provided with an open-ended slot 21 (Fig. 6) in which the said holding or tie link 18 freely passes when the stake is falling. The web 22 of the I-beam 11 is also provided with a similar open-ended slot 23 which also allows the said tie link to pass freely as the stake falls.

The inner end of the tie link 18 is pivotally secured to a lock plate 24 which lies flat on top of the web 22 of the bunk 11, when in its locking position but which is too broad to pass through the slots 21 or 23 when the stake is released. The knuckle 25, by which the inner end of the tie link 18 is pivotally joined to the lock plate 24, extends upward from said lock plate to a point close to but not touching the under side of the cover plate 20, thus preventing the upward component of the force in the link 18 from lifting the plate 24 from off the web 22, so that the motion of the outer end of the lock plate 24 is only horizontal in the box formed by the bunk 11 and its cover plate 20.

The lock plate 24 is provided with a broad lug or tooth 26 secured to its lower surface, inward from the knuckle, and adapted to enter and engage the end of a crosswise slot 27 made in the web 22. The shape of the lug 26 is such as to loosely fit in the said slot 27 so that so long as the plate 24 lies flat on the webb 22, the plate cannot move longitudinally and therefore the stake 13 is held upright by the link 18. The width of the lug 26 is greater than the width of the slot 23 in the web 22.

This lock plate 24 is locked in this locking position by means of a movable lug 28, mounted on a rotatable pivot 29 passing through the upper flanges of the bunk 11, directly over the said slot 27. The length of the lug 28 is such as to engage the top of the plate 24 when the lug 26 thereof lies in the slot 27, so as to absolutely prevent the inward end of the plate 24 from rising off the web, and thus permit the said lug 26 from leaving the slot 27. The said pivot 29 is provided with a crank 30 on the outer side of the bunk, said crank being adapted to turn the pivot 29 with its lug 28, so as to bring said lug into said locking position and to firmly hold it there, or to remove it therefrom to release the plate and its lug from their above-described locking position, to release the said stake 13.

The crank 30 is controlled in its movement by means of a control bar 31, which is pivoted thereto and which extends across the truck, beside the bunk 11, and which passes through a hole 32 in a flange 33, secured to and extending laterally from the said bunk. A notch 34 is made in the lower side of the bar 31, said notch being positioned so as to permit the bar to fall over the flange 33 when the lock lug 28 is in engagement with the top of the lock plate 24, thus firmly holding the said lug 28 from movement, in either direction, away from such locking position.

The control bar 31 is held in such locking position by any desired means, such as the pivoted eccentric plate 35, or by means of a toggle bolt or otherwise.

My improved log truck stake is operated in the following manner: Assuming that the parts are in the released position as shown in Fig. 5. In this position the plate 24 and its tooth 26 are supported on the upper side of the web 22 because the tooth is wider than the width of the slot 23 through which the tie link 18 has passed to connect with the released stake 13.

The stake 13 may now be turned upward on its pivot pins 16, causing the plate 24 to slide on the web 22. The plate 24 cannot rise out of the boxed space between the web 22 and the cover plate 20. When the stake 13 has reached its upright position the tie link 18 will engage the cover plate 20 and the tooth 26 will fall into the slot 27.

When this position is reached the control bar 31 is moved so that the notch 34 engages the flange 33, thus bringing the lock lug 28 down into engagement with the upper side of the lock plate 24. Then the bar 31 is locked in this position by the eccentric plate 35, or otherwise. The logs may then be loaded on the truck.

When it is desired to dump the load of logs from the truck, the reverse action is followed. The control bar is first released, raised to disengage the notch 34 from the flange 33, and pushed or pulled to move the lock lug 28 away from the plate 24. The pressure of the logs on the side of the stake 13 will now cause the tooth 26 to leave the slot 27 by raising the inner end of the plate 24, thus entirely freeing the stake from restraint of the holding link 18. It will, therefore, immediately turn downward on its pivot pins 16 and permit the logs to fall, the link 18 moving through the slots 21 and 23.

It will be observed that the tie link 18 is slightly curved in shape in order to avoid contact with the logs as much as possible and yet to reach up as high as practical on the stake so as to increase the leverage of the holding link on the stake and thus reduce the stress therein. It will also be observed that the cover plate effectively protects the locking mechanism from contact with the logs and keeps bark chips and dirt from interfering with the operation of the locking parts.

It is, of course, to be understood that changes may be made in the details of my improved log stake for trucks without departing from the spirit of my invention as outlined in the appended claims.

Although I have described my invention as applied to log stakes for trucks, it is obvious that the stakes may be used to hold other objects in place, and may be applied to the rear end of the truck, if desired, and also that they may be used on other vehicles than trucks, such as railroad cars, with only slight modification.

Having described my invention, what I claim and desire to secure by Letters Patent, is:

1. In a log stake for trucks, the combination of a bunk extending across the truck, and having a horizontal web; a cover plate secured to said bunk and positioned over said web; concentric pivot pins extending out from the sides of said bunk; a bifurcated stake mounted on said pivot pins; a lock plate adapted to slide on the web of the bunk and under said cover plate; a holding link pivotally secured to said lock plate and to said stake adjacent the point of bifurcation; and a lock lug mounted above said lock plate and adapted to removably hold said lock plate from sliding on said web.

2. In a log stake for trucks, the combination of a bunk extending across the truck and comprising an I-beam laid on the edges of its flanges; a cover plate secured within the top edges of its flanges adjacent the end of the bunk; concentric pivot pins extending out from the sides of the bunk; a bifurcated stake mounted on said pivot pins; a lock plate adapted to slide on the web of the bunk; a central holding link pivotally secured to said lock plate and to said stake adjacent the point of bifurcation, and engaging said cover plate to prevent the stake from falling inward; central open slots in said cover plate and said web, and adapted to permit said holding link to freely pass therethrough; and means to releasably hold said lock plate from movement on the web.

3. In a log stake for trucks, the combination of a bunk extending across the truck and comprising an open-ended box structure having slots in its two horizontal sides; concentric pivot pins extending out from the sides of the bunk; a bifurcated stake mounted on said pivot pins; a lock plate slidably mounted within said box end of the bunk; a slot in the base of said bunk and positioned inward from said pivot pins; a lug on the inner end of the under side of said plate and adapted to enter said slot to hold said lock plate from movement on said bunk; means to releasably hold said lug in said slot; a tie link pivotally secured to said stake above said pivot pins; and a knuckle joining said tie link with the outer end of said lock plate and substantially engaging the upper side of said bunk box, whereby the outer end of said lock plate is prevented from rising in said bunk box.

4. In a log stake for trucks as set forth in claim 3 wherein said means to releasably hold said lug in said slot comprises a bar mounted on said bunk and extending laterally across said truck; a crank secured to the end of said bar and pivoted to said bunk over said slot; a lug on the pivot of said crank and adapted to be swung thereby into or out of contact with the upper side of said lock plate, to hold the inner end of said plate down on the base of said bunk or to release it from such restrained position.

FERDINAND G. BUSENIUS.

REFERENCES CITED

The following references are of record in the file of this patent:

UNITED STATES PATENTS

| Number | Name | Date |
| --- | --- | --- |
| 1,018,818 | Gaskill | Feb. 27, 1912 |
| 1,260,179 | Fry | Mar. 19, 1918 |
| 1,557,195 | Clapp | Oct. 13, 1925 |